July 14, 1953 — R. E. DAHL — 2,645,703
INERT GAS-SHIELDED ARC WELDING APPARATUS
Filed March 8, 1951 — 4 Sheets-Sheet 1
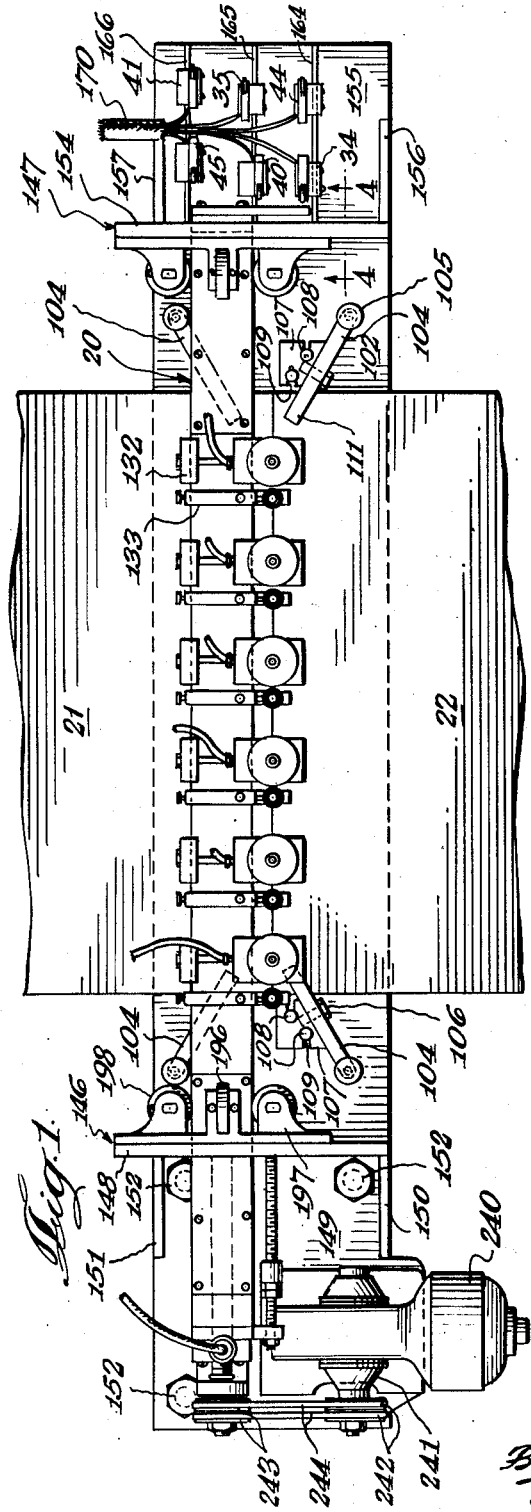
Inventor
Robert E. Dahl
By J. Irving Silverman
Attorney

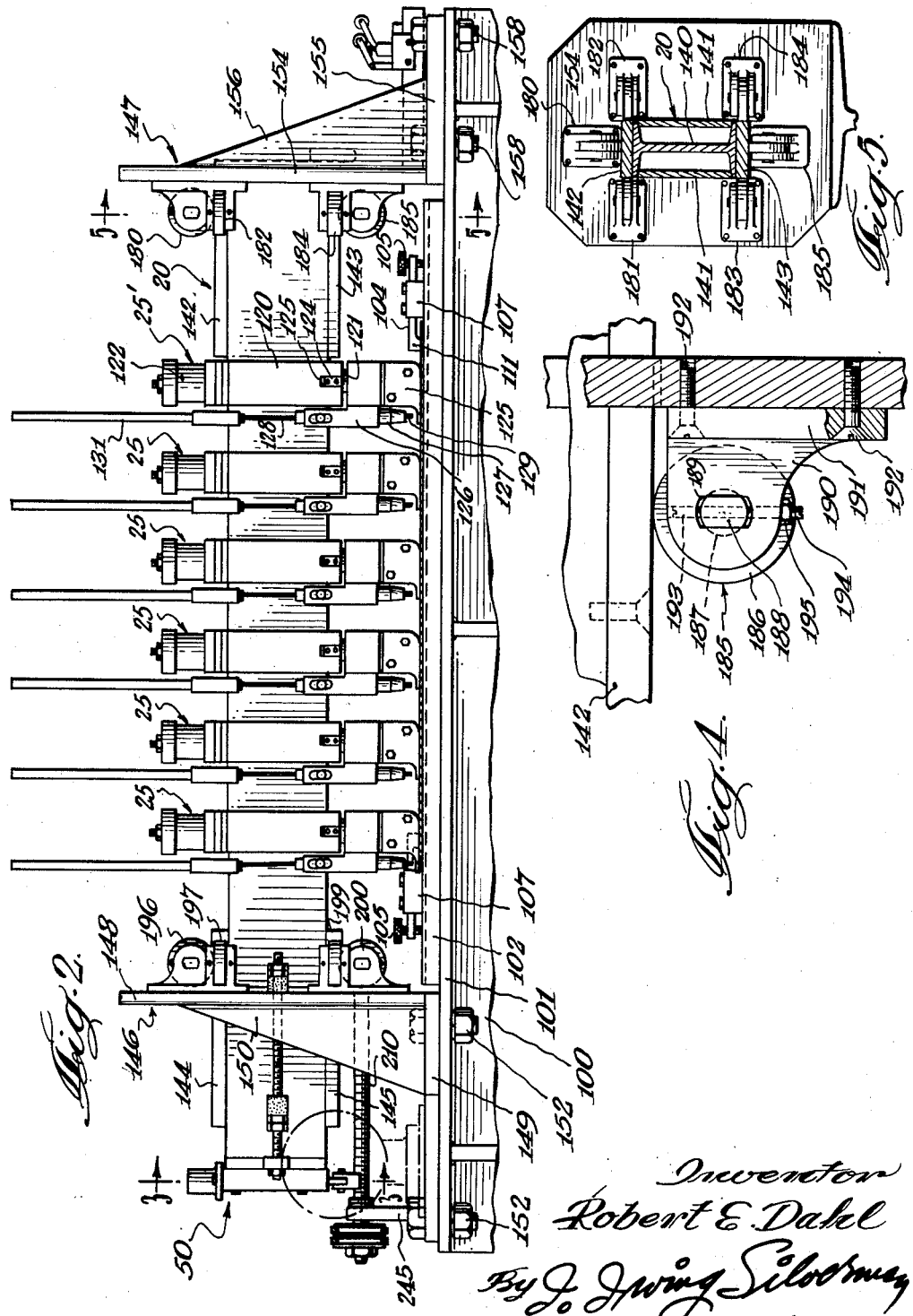

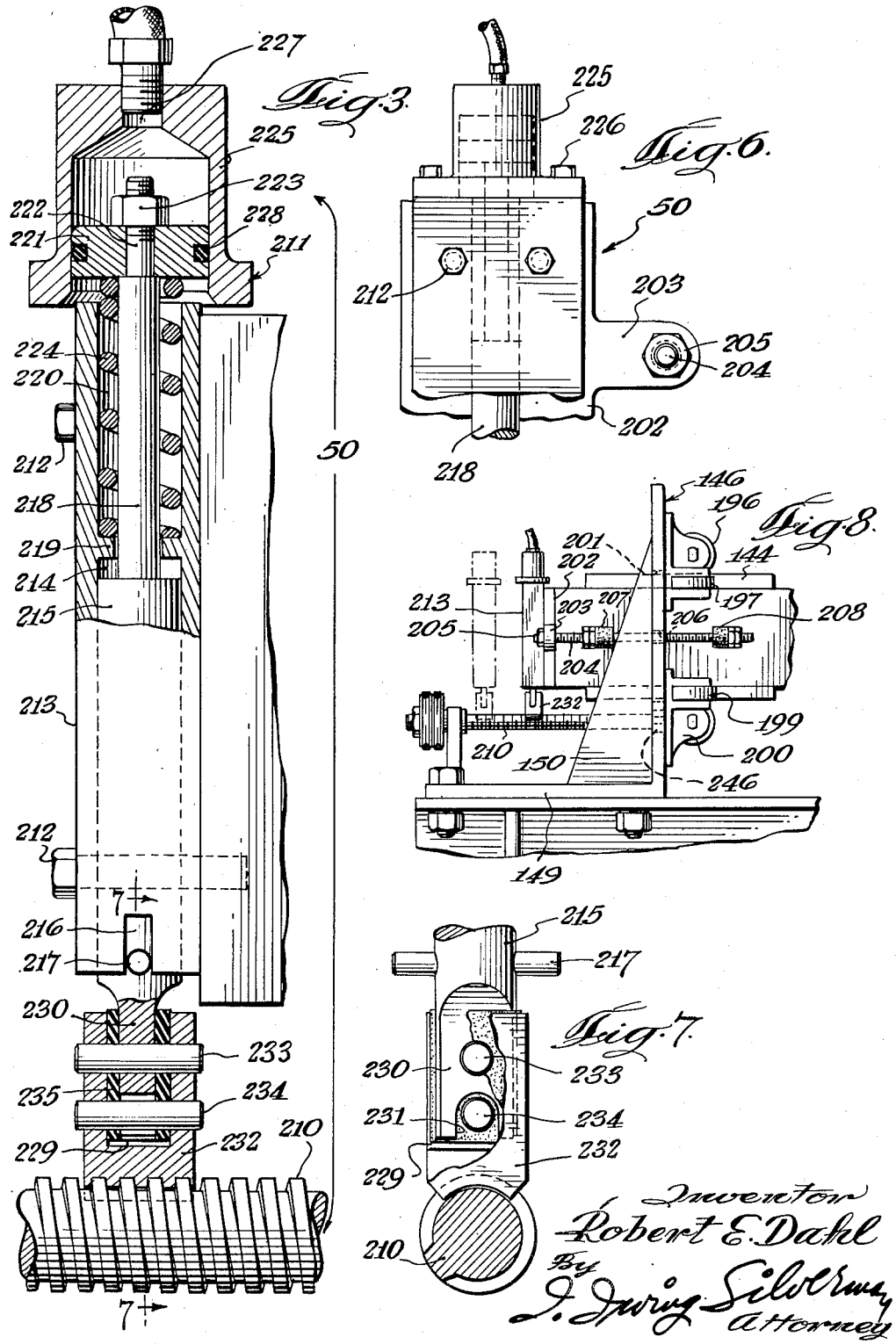

July 14, 1953        R. E. DAHL        2,645,703
INERT GAS-SHIELDED ARC WELDING APPARATUS
Filed March 8, 1951        4 Sheets-Sheet 4
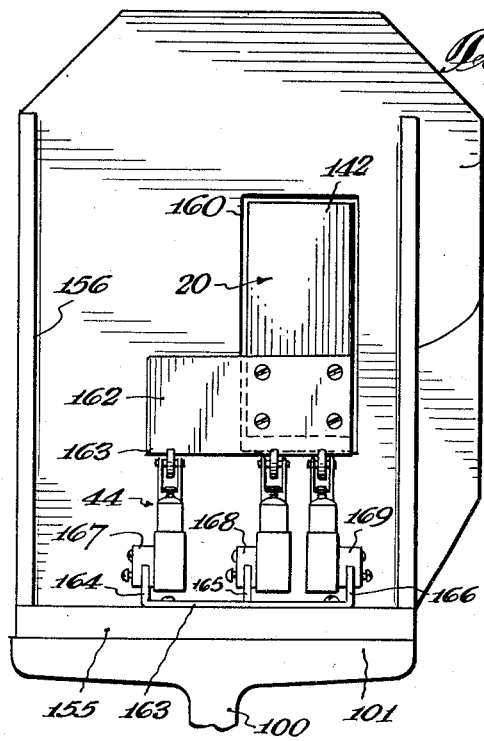
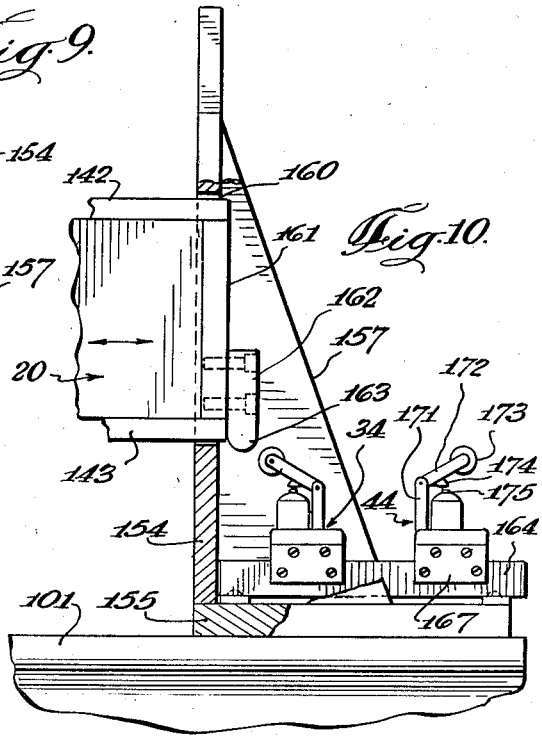
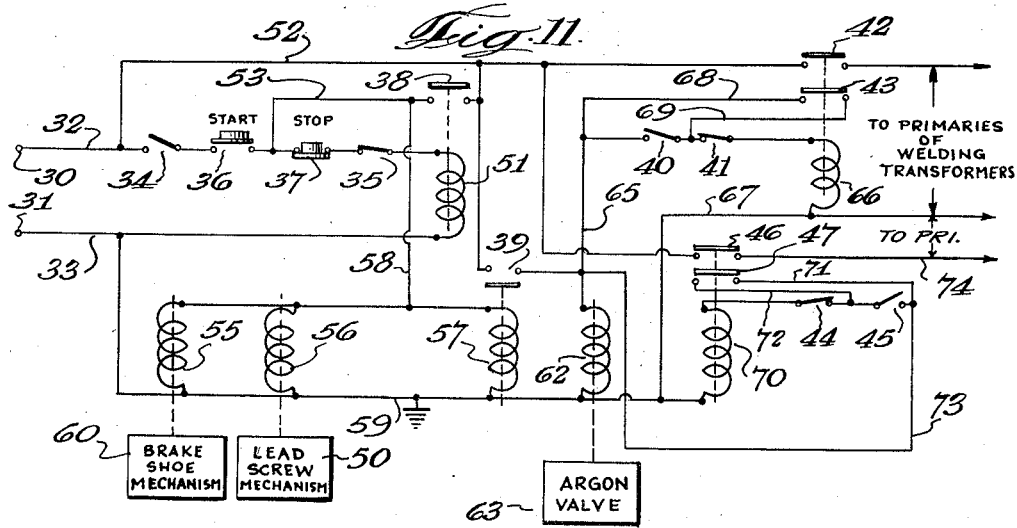
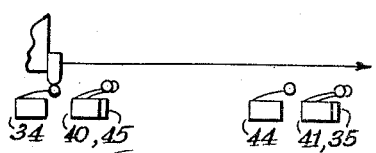
Inventors
Robert E. Dahl
By L. Irving Silverman
Attorney Patented July 14, 1953

2,645,703

UNITED STATES PATENT OFFICE 2,645,703

INERT GAS-SHIELDED ARC WELDING APPARATUS

Robert E. Dahl, Hinsdale, Ill., assignor of one-half to Advance Transformer Co., Chicago, Ill., a corporation of Illinois Application March 8, 1951, Serial No. 214,545

3 Claims. (Cl. 219—8)

This invention relates to a welding apparatus and more particularly relates to apparatus for use with inert gas shielding.

The inert gas-shielded arc welding system is especially adapted for welding metals not readily welded by conventional methods. In this system, the arc is established at a fairly low voltage between a substantially non-consumable electrode such as a tungsten wire, and the work piece, and while the arc is extant, the same is enveloped in an inert gas such as argon. The great advantages of this system are well known, and include elimination of flux, cleanliness, and many other features.

The principal object of the invention is the adaptation of a multiple welding head apparatus to the welding of lengths of silicon steel together to form a roll, and in connection with such object it is intended to provide non-warping, strong, clean welds at a great speed.

Another object of the invention is to provide apparatus of the character described which can be installed readily upon a conveyor line to produce rolled steel on a production basis.

A further object of the invention lies in the provision of a novel carriage for carrying the welding heads; novel means for moving the carriage and limiting the movement thereof; novel means for supporting and guiding the carriage; novel apparatus for operating the carriage moving means; novel means for adjusting the size of the weld achieved.

Other objects are concerned with the operation of the electrical portion of the invention, and the novel arrangement of switches to permit the adjustment thereof to cause any desired time cycle.

With the foregoing and other objects in view which will appear as the description proceeds, the invention consists of certain novel features of construction, arrangement and a combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of this invention, there is illustrated in the accompanying drawings a preferred embodiment thereof, from an inspection of which, when considered in connection with the following description, this invention, its mode of construction, assembly and operation, and many of its advantages should be readily understood and appreciated.

Referring to the drawings in which the same characters of reference are employed to indicate corresponding or similar parts throughout the several figures of the drawings:

Fig. 1 is a top plan view of a welding station of a strip forming machine showing my new automatic welding apparatus at said station.

Figs. 1a, 1b, and 1c are diagrammatic plan views showing the manner in which the welding occurs across the strip of metal being welded by my new apparatus.

Fig. 2 is an elevational view of the apparatus of Fig. 1 taken from a side which may be considered the front since the metal sheets being welded are fed under the welding heads in a direction which would be into the drawing as viewed.

Fig. 3 is a sectional view through the screw feed mechanism taken along the line 3—3 of Fig. 2 and in the indicated direction, on an enlarged scale.

Fig. 4 is a sectional view taken generally along the line 4—4 of Fig. 1 and in the indicated direction showing a detail of the bearing wheel mountings.

Fig. 5 is a sectional view taken generally along the line 5—5 of Fig. 2 and in the indicated direction.

Fig. 6 is a fragmentary enlarged elevational view of the top of the screw feed mechanism taken from the left hand end of the apparatus as viewed in Fig. 2.

Fig. 7 is a vertical sectional view taken through the lower end of the power take-off screw feed mechanism along the line 7—7 of Fig. 3 and in the direction indicated.

Fig. 8 is a front elevational detail of the left hand end of the apparatus of Fig. 2.

Fig. 9 is an end elevational view of the right hand end of the apparatus of Fig. 2.

Fig. 10 is a sectional view through that portion of the apparatus illustrated in Fig. 9.

Fig. 11 is a diagrammatic representation of the electrical circuit of the apparatus.

Fig. 12 is a diagrammatic representation of the switch operating sequence which is explained in the specification in connection with Fig. 11.

Generally my apparatus is intended to be used to fabricate coils of sheet steel. Thus, sheets of silicon steel intended for use in electromagnetic apparatus can be purchased economically in lengths, but for use in high speed automatic stamping machines, as for example in stamping out transformer laminations, it is best that the steel be coiled. The longer the coil, the more economical the stamping operation and the less waste for obvious reasons. Accordingly it has been recognized that such welding operations are highly desirable, but the difficulty has been that the welding apparatus and the methods used have been expensive and difficult to carry out.

In my invention, the problem of warpage has been overcome by the use of a multiple welding head carriage which welds a large number of places simultaneously so that the stroke of the carriage is short, and warpage and strain engendered by welding is not cumulative. In addition, I am able to produce substantially a perfect butt junction in a relatively wide sheet in a very short time.

The apparatus comprises the movable carriage and means for driving and controlling the carriage as well as certain other details presently to be set forth. The apparatus is arranged at a station which is provided on a production line along which the metal lengths are moved. Thus, for example, the line may consist of a conveyor having at one end access to a stock pile so that the lengths can be placed on the line for movement down to the welding station. There may be a shear station prior to the welding station to square the ends of the metal lengths, together with suitable clamps and the like. None of these are shown since the invention resides principally in the apparatus at the welding station shown in Fig. 1. The conveyor line on the downstream side of the welding station, i.e. that side towards which the welded lengths are moved, may have a coil winding machine to take up the coil as it is formed. In the line constructed using my invention, such a coil winding device was provided operable by remote electrical control from the welding station so that a minimum of operating personnel was required to produce the coils. These expedients are of course refinements to the overall system and form no part of the invention, and hence are not here illustrated.

Generally, the invention is best understood by first considering the diagrammatic representations of Figs. 11 and 12. Those portions of importance to the invention have been illustrated as well in other figures, but certain parts are referred to or diagrammatically illustrated without further figures. Consider that the invention includes a carriage 20 which extends across the conveyor of the machine. There are two members 21 and 22 brought together beneath the carriage 20 in abutting engagement with their juncture 24 coinciding with the line of welding (see Fig. 1a). Now it should be understood that the carriage 20 is arranged to move across the machine, i. e., right and left as viewed in the figures. It carries a number of welding heads 25 of which there are six shown, although any suitable number may be used. The heads are fixed to the carriage and spaced one relative to the other. The total movement of the carriage will therefore be the distance between two adjacent heads. This can be a relatively short distance traversed in a short time since all heads are welding at the same time as will be explained.

With the carriage 20 at its initial position, namely, at its furthest point of movement to the left as viewed in Fig. 1, the general position of the carriage, heads and metal lengths 21 and 22 is as shown in Fig. 1a. The control circuit shown in Fig. 11 is energized from a source of power such as 110 volt A. C. line, the terminals of the line being shown at 30 and 31. The terminals 30 and 31 are connected by leads 32 and 33 respectively to the various components of the control circuit. Line 33 may be grounded. The various switches of the circuit in this initial position are arranged as follows: the interlock switch 34 is closed, providing the carriage is all the way back to the left; the start switch 36 is open; the stop switch 37 is closed; the solenoid switch 39 is open; the switch 40 is open; the switch 41 is closed; the solenoid switches 42 and 43 are both open; the switch 44 is closed; the switch 45 is open, and solenoid switches 46 and 47 are open. Let us suppose now that everything is in proper place and it is desired to start the welding operation. The following sequence of events occurs:

The screw feed mechanism 50 (see Figs. 3, 6 and 7) is posed for operation, but, although the lead screw is always rotating as will hereinafter be described, the carriage 20 will not move until and unless the half nut engages the lead screw. When the start button is pressed it closes the switch 36 which momentarily completes the circuit from the leads 32 and 33 through the solenoid 51. The solenoid 51 closes the switch 38 which short circuits the switches 34 and 36 by way of the leads 52 and 53, so that the solenoid thereafter remains energized, and the switch 38 is closed even though the start button is released and the switch 36 is open. With the switch 38 closed, current is free to flow in the circuits of the solenoids, 55, 56, and 57 by way of the lead 58 to ground 59.

The solenoid 55 operates a brake shoe mechanism 60 which releases the welding head shoes upon the joint 24; the solenoid 56 operates the screw feed mechanism 50 which drops the partial nut upon the lead screw thereby starting the carriage forward; the solenoid 57 operates to close the switch 39. The solenoid 57 is a quick-make, slow-break time delay relay and when it operates it energizes the solenoid 62 to operate the mechanism 63. This may be a valve arrangement which starts the flow of the inert gas, such as argon, to the nozzles of the welding heads.

All of the above occurs in a matter of about three seconds, during which time the carriage has traversed a short distance past the interlock switch 34 to a point where the head upon the extreme left end of the carriage approaches the edge of the joint. At this point, the moving carriage has a projection that engages certain switch arms, closing the switches 40 and 45. These switches energize the transformers of all the welding heads so that all begin immediate operation. The switch 40 upon being closed completes a circuit from switch 39 through lead 65 through normally closed switch 41, through solenoid 66 and back to ground 59 through lead 67. The solenoid 66 is a part of a holding relay which includes the two switches 42 and 43 which are closed when the solenoid 66 is energized. Switch 40 is now by-passed by leads 68 and 69, and the primaries of the transformers of the five welding heads of the left hand end of the carriage 20 are energized from the line by way of the leads 52 and 67. In a similar manner, the switch 45 being closed energizes the solenoid 70 which closed switches 46 and 47 through switch 44, thereby by-passing switch 45 through leads 71 and 72 keeping solenoid 70 energized by way of lead 73 from switch 39. The primary of the transformer feeding the last welding head on the right hand end of the carriage 20 is thus energized through leads 74 and 67. Note that all of the transformer primaries are energized simultaneously.

Now all welding heads are welding and the diagrammatic representation of Fig. 1b shows the situation while all heads are operating and six independent welds 80 are being made across the metal lengths to join them along the seam 24. The heads are so spaced that when the stroke of the carriage 20 is completed, the six welds will overlap end to end a slight amount so that actually the effect is that of a single long weld. Note that the right hand end of the carriage 20 is approaching the right hand edge of the metal lengths 21 and 22.

In order to achieve the necessary overlap of welds 80, the last welding head on the right hand end, indicated as 25' in Fig. 1c will have to travel onto the mandrel, and thus may damage the apparatus if permitted to continue to weld. In order to prevent this, as the carriage approaches the end of its stroke, first the projection thereon strikes the arm of the switch 44, opening the same. This immediately opens the circuit of the holding relay whose solenoid is 70, thereby opening the switches 46 and 47 and cutting off the power to the primary of the sixth transformer. This is so adjusted that this cut-off occurs the instant that the sixth welding head leaves the workpiece. Thus there can be no damage to the apparatus.

Thereafter, the said projection strikes switch arms of switches 41 and 35, opening both of said switches. The opening of switch 41 de-energizes solenoid 66, cutting off the remaining five transformers. The opening of the switch 35 de-energizes the solenoid 51 which, as will be recognized, completely de-energizes the entire electrical circuit. The brake shoes are raised; the partial nut is raised from the lead screw; and the flow of inert gas is cut off. The weld has been made and the entire carriage can now be pushed back manually or otherwise to its initial position, poised for the next weld.

The electrical operation of the device having been explained, I will now proceed to explain the mechanical construction thereof whereby the objects and advantages hereinabove set forth are achieved.

Referring now to Figs. 1 and 2, the apparatus is supported upon a metal base 100 which may also be a part of the conveyor referred to hereinabove. Insofar as the welding apparatus is concerned, at the welding station the metal base is constructed of any steel structural members suitably assembled and provides a bed 101 upon the top thereof to which the various components are secured. In the center of the bed 101 is an elongate metal mandrel 102 upon which the welding operation takes place, said mandrel being of substantial thickness and extending across the length of the apparatus. As noted in Fig. 1, at the opposite ends of the mandrel there are arranged diagonally extending clamp members 104 there being two on either side of the line of welding, a total of four such clamp members. Each member 104 consists of an elongate arm having a thumb screw 105 (see Fig. 2) at one end thereof screw threaded through the end of the member into engagement with the mandrel. The center of the arm 104 is pivoted at 106 to a block 107 secured to the mandrel 102 by means of bolts 108. The openings for the bolts 108 are slotted as at 109 to permit adjustment of the position of the block and hence the positions of the clamp members 104. The end of the arm 104 opposite the thumb screw 105 engages the corner of each of the metal lengths 21 and 22 as shown at 111 in Fig. 1 to hold the same motionless while the welding is taking place. Obiously screwing up on the thumb screw will raise or lower the end 111.

All of the welding heads are substantially identical. Each is designated 25 except for the right hand one 25' which stops welding a fraction of a minute before the others do in order to prevent damage to the mandrel. Each head consists of a fixed portion 120 having a central cylindrical reciprocating member 121 operated by an air cylinder 122 on the top thereof. Each reciprocating member 121 has a key 124 riding in a suitable guide 125 in the fixed portion 120, and carries on the bottom end thereof a bifurcated brake shoe 125' which is adapted to engage upon and straddle the line of welding 24 as same takes place. The member 121 normally is biased against the work, so that when the air cylinder is not operating the shoes engage the line 24, but when air is permitted to enter the cylinders 122, the shoes 125' will be raised. Thus the electrical circuit is arranged so that energization of solenoid 55 lowers shoes 125'. Secured to the shoes 125' is an electrode holder 126 having a gas nozzle 127 and presenting to the weld a suitable electrode 128, the tips 129 thereof extending out of the nozzle as illustrated in Fig. 2. The electrode may be fairly long in which case a guide 131 may be used for each head 25. The gas conduits and electrical connections to the electrodes 128 and the nozzle 127 have not been shown, since same are more or less conventional.

Each of the heads is secured to the carriage 20 by means of clamping devices 132 and the electrode guides 131 are also clamped to the carriage 20 by clamping devices 133. The heads are preferably equidistant one from the other and that distance corresponds to the length of any of the welds 80. Obviously, the carriage need travel only a short distance in order to achieve the complete welding of the metal lengths 21 and 22 together.

Referring now to the carriage 20 and its supporting means, note in Fig. 5 that the carriage 20 is formed as an elongate member of rectangular cross section supported for sliding movement across the width of the metal lengths 21 and 22. The carriage is conveniently built of simple structural members comprising an I-beam 140 having the sides closed off by strips of metal 141 welded thereto on opposite sides thereof. At the top and bottom of the carriage 20 on opposite sides thereof, there are secured rectangular bearing bars 142, 143, 144, and 145 having their sides and the exposed faces hardened. The carriage 20 is supported by and permitted to slide through end standards 146 and 147 secured to the bed 101.

Each of the standards 146 and 147 may be constructed somewhat alike out of simple structural members welded or secured together in any suitable manner. The standard 146 of my apparatus has an upstanding plate 148 mounted upon a base plate 149 and braced by triangular braces 150 and 151 arranged at the edges of the plate 148. The plate 149 is secured to the bed 101 by suitable bolts 152. The standard 147 includes an upright plate 154 mounted upon a base plate 155, braced by triangular braces 156 and 157, the whole being secured to the bed 101 by bolts 158.

Referring now to the right hand end of the apparatus, the carriage 20 which includes the bearing bars 142 and 143 on top and bottom is adapted to slide through the upright plate 154. For this purpose the plate 154 is provided with a rectangular opening 160 which clears the carriage on all sides. The end of the carriage is closed off by a plate 161 to which there is secured a cam member 162 having a lower cam edge 163 for a purpose presently described. Upon the upper surface of the plate 155 there is a bracket 163 which has three tracks 164, 165, and 166 arranged parallel with the line of movement of the line of movement of the carriage 20. Upon each track are mounted sliders such as shown at 167, 168, and 169. These sliders can be clamped to the respective tracks upon which they are mounted by suitable screws and obviously can be adjusted to different positions therealong. To each of the sliders there is secured a switch of the type operable by pressure being applied against the arm of a linkage of some sort. Such switches are now commercially available under the name "Microswitch." There may be one switch for each of the switches referred to hereinbefore as 34, 35, 40, 41, 44, and 45. In the case of two switches operating together, a single switch but having a double pole may be used if desired. In order to render the explanation clear, I have shown in Fig. 1, six single pole switches, approximately arranged along the tracks to correspond with the positions described in connection with the electrical circuits. Thus, as the carriage moves to the right, first the cam surface 163 operates switch 34 on track 164; then it operates switches 40 and 45 on tracks 164 and 165; then it operates switch 44 on track 164; and finally switches 35 and 41 on tracks 165 and 166. The electrical leads for the switches are shown entering a cable 170.

Looking for the moment at Fig. 10, the construction of one of the switches will be described for clarity. The switch includes an upright 171, having a pivoted arm 172 which carries a roller 173 disposed in the path of the cam surface 163. As the cam surface 163 engages the roller 173, it presses the arm down, causing the projection 174 to depress the switch button 175. This may either open or close an electrical circuit as the case may be. In the case of the particular switch being described the circuit normally being closed, the depressing of the button 175 will open the circuit.

In order to keep the drawings uncluttered, the guiding means for the carriage 20 are not illustrated in Figs. 9 and 10. Referring therefore to Figs. 4 and 5, note that in order to keep the carriage sliding perfectly along a predetermined path, six guide rollers are provided for confining the end of the carriage. These guide rollers are all mounted upon the upright plate 154 and consist of an upper roller 180 engaging the top surface of the bearing bar 142, upper side rollers 181 and 182 engaging the sides of the bearing bar 142, and rollers 183, 184, and 185 engaging respectively the sides and bottom surface of the bearing bar 143. All rollers are adjustable to hug the respective surface they engage to guide and confine the path of the carriage and to enable same to move freely. For the exact construction of the rollers, attention is invited to Fig. 4.

Referring to Fig. 4, note that the roller 185 comprises a hardened wheel 186 journalled by suitable ball or roller bearings upon a fixed shaft 187 whose ends are flattened as at 188 to engage and be slidable within slots 189 formed in cheek plates 190. The cheek plates 190 are mounted upon a base 191 bolted to the upright plate 154 by any suitable fastening means 192. Upper and lower set screws 193 and 194 having their ends engaged against the ends 188 of the shaft 187, enable the pressure of the wheel 186 relative to the bearing plate 142 to be fixed. A lock nut 195 may be used to lock the setting. All rollers are constructed in substantially the same manner.

Referring now to the left hand side of the apparatus, the upright plate 148 is also provided with rollers similar to those described and for the same purpose, namely guiding and supporting the left hand end of the carriage. Thus the rollers 196, 197, 198, 199, and 200 (the mate of roller 199 is not visible in the drawings) are provided of the same construction as described in connection with Fig. 4 and same guide the carriage through the opening 201 (see Fig. 8) provided in the upright plate 148.

The left hand end of the carriage is closed off by a plate 202 which has a lateral ear 203 to which is fastened a rod 204 by any suitable means such as the nut 205. The end of the rod may have a reduced diameter screw threaded portion providing an engaging shoulder abutting against the right hand side of the ear 203, but it is not believed necessary to illustrate any particular means. The rod 204 preferably is screw threaded throughout its length, and extends through a suitable opening 206 provided in the upright plate 148. On opposite sides of the plate 148, the rod carries rubber bumpers 207 and 208 adjustably secured by lock nuts as illustrated. Obviously, the carriage 20 will be limited in movement to the distance between the rubber bumpers.

The screw feed mechanism 50 is disposed at the left hand end of the apparatus and consists of a rotating screw 210 and an air cylinder operated lead screw device 211. The device 211 is secured to the plate 202 by bolts 212 and includes the block 213 having a central cylindrical bore 214 in which a piston 215 is adapted to reciprocate. The block has a guide 216 and the piston protrudes from the bottom of the block and has a pin 217 riding the guide to keep the piston properly aligned. A connecting rod 218 attached to the piston 215 extends through the partition 219 and through a spring chamber 220, and has a second piston 221 secured to the reduced diameter end 222 by a retaining nut 223. A coil spring 224 in the chamber 220 surrounding the rod 218 biases said rod in an upward direction by engaging against the bottom of the piston 221 at one end and the partition 214 at its other end.

The piston 221 is adapted to reciprocate in an air cylinder 225 mounted on top of the block 213 by the bolts 226 and having a compressed air inlet at its top 227 fed from a suitable source (not shown). The piston 215 is raised to its fullest extent by the spring 224 normally, and when compressed air is admitted to the cylinder 225 the piston 221 and consequently the piston 215 will move downward. The piston 221 has a suitable sealing ring 228.

Referring now to the bottom of Fig. 3 and to

Fig. 7, the bottom end of the piston 215 has a flat portion 230 formed thereon with an end slot 231. This flat portion 230 is pinned to a half-nut 232 by a pair of dowel pins 233 and 234. The pin 233 extends completely through the portion 230 but the pin 234 passes through the end slot 231 thereby permitting limited swinging of the half nut about the pin 233. The half nut 232 is bifurcated as at 229 to receive the portion 230 and a rubber boot 235 so that the connection is resilient and somewhat shock-proof. Obviously, when the piston 215 is moved downward the half nut 232 will engage the rotating lead screw 210 and move parallel with the axis thereof thereby translating the carriage 20 as well.

The remainder of the apparatus comprises the mechanism for driving the lead screw 210. This can be any rotating mechanism, since as has been explained, the screw is rotating constantly. I have shown, for example, an electric motor 240 mounted on the base plate 149 (see Fig. 1) driving a gear reduction mechanism 241 which in turn drives a sheave 242. This sheave 242 (which may comprise a multiple pulley assembly) drives another sheave 243 by a belt system 244. The lead screw is journalled at one end upon a bracket 245 mounted upon the plate 149 and has the sheave 243 keyed to the protruding end so that rotation of the motor causes rotation of the lead screw. The other end of the lead screw 210 is journalled in a suitable bearing 246 provided in the plate 148 below the opening 201.

The manner in which the apparatus operates is believed to be obvious from the above explanation. The lengths of metal 21 and 22 are abutted on the line 24 and clamped to the mandrel 102 by the clamping members 104. The carriage 20 is all the way to the left, the half nut 232 is free from the lead screw 210, which of course is rotating, and the brake shoes 125 are raised. The brake shoes may then be lowered upon the line 24 by some separate switch, and the mechanism started. The half nut 232 engages the lead screw 210 and begins to move the carriage across the mandrel. If the brake shoes have not as yet been lowered, energization of solenoid 55 will do so. The switches at the right hand end of the apparatus are operated as explained in connection with the electrical circuits, by the engagement of the same in the proper order by the cam edge 163 as the carriage moves in making the weld. At the end of the stroke, the half-nut 232 automatically is disengaged from the lead screw 210, and the brake shoes automatically raised. Then the carriage 20 is pushed back to its starting position ready for the next weld. The clamp members 104 are released and the welded lengths taken up by the reel mechanism (not shown).

Many variations are contemplated by my invention, it being desired that the only limitations shall be measured by the broadest construction of the appended claims.

What is claimed is:

1. In apparatus of the character described, which is adapted to weld a butt joint between a pair of members along a weld juncture, a carriage having a plurality of welding heads adjustably mounted thereon, a support, standards upon the support having the ends of the carriage slidably mounted thereon, a mandrel upon said support, means for moving said welding heads into welding position upon said support, and means for moving the carriage a distance equal to that distance between adjacent welding heads plus a small overlap distance, means for starting the operation of said apparatus, means for initiating operation of said carriage moving means and also moving the heads into welding position simultaneously with starting the operation of the apparatus, means for leading electrical current to the welding heads shortly after starting the apparatus and when the trailing welding head reaches the edge of the members, means for stopping the flow of electrical current to the first head shortly before the end of the stroke of the carriage, and means for stopping the flow of current to the other heads and stopping the movement of the carriage and moving the welding heads out of position all simultaneously when the end of the stroke is reached.

2. Welding apparatus of the character described which comprises a framework having a mandrel arranged to support a pair of abutted metal lengths for welding same along a weld juncture, a pair of upstanding plates at opposite ends of the framework, a carriage having each end thereof extending through and beyond a said plate and mounted between said plates for sliding movement along a predetermined horizontal path along the line of said weld juncture, a plurality of movable welding heads mounted upon said carriage at equal distances one from the other, means for moving said carriage the distance between adjacent heads plus a small overlap distance at a given rate of speed to produce a plurality of short welds end to end and slightly overlapped, an electrical control circuit for cycling the operation of the welding apparatus in respect to the position of the carriage including a switch for stopping flow of current to the first head shortly before the end of the stroke of the carriage and a plurality of switches for stopping the flow of current to the other heads and stopping movement of the carriage and moving the welding heads out of position all simultaneously when the end of the stroke is reached, said switches being supported adjacent one of said plates and an end of said carriage having cam means arranged sequentially to close the said switches to effect the above described operation of the apparatus.

3. Welding apparatus of the character described which comprises a framework having a mandrel arranged to support a pair of abutted metal lengths for welding same along a weld juncture, a pair of upstanding plates at opposite ends of the framework, a carriage having each end thereof extending through and beyond a said plate and mounted between said plates for sliding movement along a predetermined horizontal path along the line of said weld juncture, a plurality of movable welding heads mounted upon said carriage at equal distances one from the other, means for moving said carriage the distance between adjacent heads plus a small overlap distance at a given rate of speed to produce a plurality of short welds end to end and slightly overlapped, an electrical control circuit for cycling the operation of the welding apparatus in respect to the position of the carriage including a switch for stopping flow of current to the first head shortly before the end of the stroke of the carriage and a plurality of switches for stopping the flow of current to the other heads and stopping movement of the carriage and moving the welding heads out of position all simultaneously when the end of the stroke is reached, said switches being supported adjacent one of said plates and an end of said carriage having cam means arranged sequentially to close the said switches to effect the above described operation of the apparatus, said switches having arms for mechanical contact by said cam means for operating the same, said apparatus having means for supporting said switches in a predetermined position for such sequential operation comprising a bracket member having a plurality of tracks thereon parallel with the line of movement of said carriage, said switches being slidably mounted along the tracks and having means for securing same in any desired positions upon the tracks to obtain thereby any desired sequential operation thereof as the carriage moves.

ROBERT E. DAHL.

References Cited in the file of this patent

UNITED STATES PATENTS

| Number | Name | Date |
|---|---|---|
| 1,552,248 | Tobey | Sept. 1, 1925 |
| 1,576,160 | Tobey | Mar. 9, 1926 |
| 2,172,080 | Fay et al. | Sept. 5, 1939 |
| 2,219,493 | Reed | Oct. 29, 1940 |
| 2,344,534 | Bucknam | Mar. 21, 1944 |
| 2,510,207 | Behnke et al. | June 6, 1950 |
| 2,544,711 | Mikhalapov | Mar. 13, 1951 |
| 2,547,872 | Kissick | Apr. 3, 1951 |